United States Patent
Hill

(10) Patent No.: US 12,416,318 B2
(45) Date of Patent: Sep. 16, 2025

(54) MUSCLE ACTUATOR SYSTEM

(71) Applicant: Adaract, Salt Lake City, UT (US)

(72) Inventor: Joseph Daniel Hill, Salt Lake City, UT (US)

(73) Assignee: Adaract, Salt Lake City, UT (US)

( * ) Notice: Subject to any disclaimer, the term of this patent is extended or adjusted under 35 U.S.C. 154(b) by 0 days.

(21) Appl. No.: 18/798,629

(22) Filed: Aug. 8, 2024

(65) Prior Publication Data
US 2025/0052263 A1     Feb. 13, 2025

Related U.S. Application Data

(60) Provisional application No. 63/531,532, filed on Aug. 8, 2023, provisional application No. 63/531,533, filed on Aug. 8, 2023.

(51) Int. Cl.
| | | |
|---|---|---|
| *F15B 15/10* | (2006.01) | |
| *B25J 9/10* | (2006.01) | |
| *F15B 15/14* | (2006.01) | |
| *F15B 15/20* | (2006.01) | |

(52) U.S. Cl.
CPC ........... *F15B 15/103* (2013.01); *B25J 9/1075* (2013.01); *F15B 15/149* (2013.01); *F15B 15/20* (2013.01)

(58) Field of Classification Search
CPC .............................. F15B 15/103; F15B 15/149
See application file for complete search history.

(56) References Cited

U.S. PATENT DOCUMENTS

| | | | | |
|---|---|---|---|---|
| 4,751,869 A | * | 6/1988 | Paynter ................. | F15B 15/103 92/92 |
| 5,014,600 A | * | 5/1991 | Krauter ................. | F15B 15/103 92/92 |
| 5,018,436 A | | 5/1991 | Evangelista et al. | |
| 5,052,273 A | * | 10/1991 | Sakaguchi .......... | F15B 15/2846 92/5 R |

(Continued)

FOREIGN PATENT DOCUMENTS

| | | |
|---|---|---|
| WO | 2009085392 A1 | 7/2009 |
| WO | 2023105925 A1 | 6/2023 |

OTHER PUBLICATIONS

International Search Report received in PCT/US24/41562 dated Nov. 27, 2024.

*Primary Examiner* — Thomas E Lazo
(74) *Attorney, Agent, or Firm* — Run8 Patent Group, LLC; Peter Miller; Alexander Rodriguez

(57) ABSTRACT

A muscle actuator includes: a fitting; an inner tube; a ferrule; an outer sleeve; and a potting material. The inner tube defines a proximal section arranged within the fitting. The needle is arranged within the proximal section of the inner tube and extending through the fitting. The ferrule: is arranged about the proximal section of the inner tube within the fitting; and compresses the proximal section of the inner tube about the needle. The outer sleeve: concentrically encompasses the inner tube; is configured to increase in diameter response to increased pressure within the inner tube; and defines a proximal sleeve section defining a void within the fitting. The potting material is configured to: occupy the void within the fitting; retain the inner tube, the needle, the ferrule, and the outer sleeve against the fitting; and transfer tensile forces from the inner tube and the outer sleeve into the fitting.

20 Claims, 6 Drawing Sheets

(56) References Cited

U.S. PATENT DOCUMENTS

| | | | | |
|---|---|---|---|---|
| 5,185,932 | A | * | 2/1993 | Caines .................. F15B 15/103 30/288 |
| 6,349,746 | B1 | * | 2/2002 | Bergemann ........... F15B 15/103 138/123 |
| 10,415,606 | B2 | * | 9/2019 | Kouno .................. F15B 15/103 |
| 2004/0107829 | A1 | * | 6/2004 | Davis .................... F15B 15/103 92/90 |
| 2022/0307523 | A1 | | 9/2022 | Hill et al. |
| 2025/0067286 | A1 | * | 2/2025 | Oono .................... F15B 15/103 |

* cited by examiner

MUSCLE ACTUATOR SYSTEM

CROSS-REFERENCE TO RELATED APPLICATIONS

This Application claims the benefit of U.S. Provisional Application Nos. 63/531,532, filed on 8 Aug. 2023, and 63/531,533, filed on 8 Aug. 2023, each of which is hereby incorporated in its entirety by this reference.

TECHNICAL FIELD

This invention relates generally to the field of actuators and more specifically to a new and useful system for a high-pressure muscle actuator in the field of actuators.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
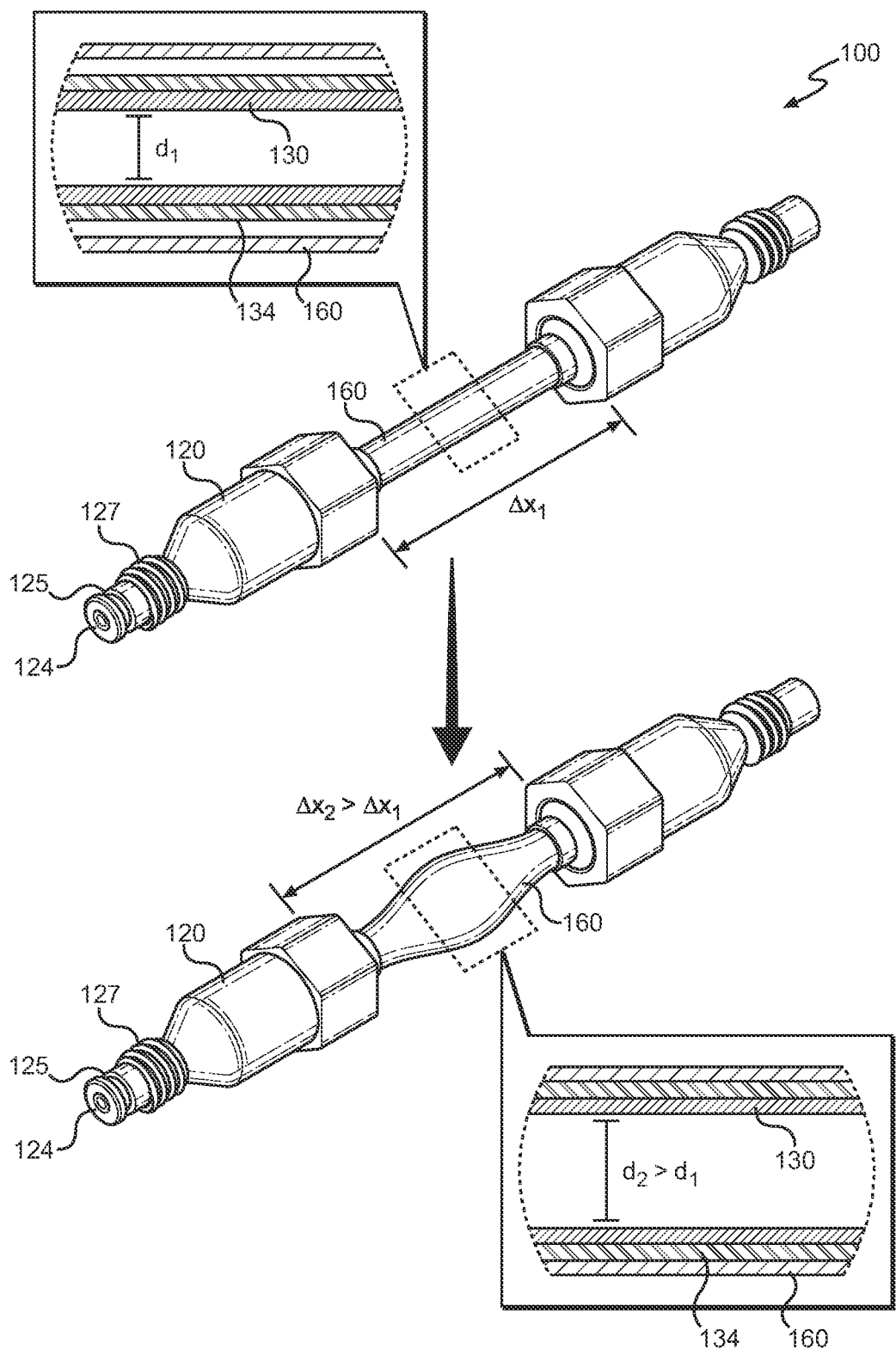
FIG. 1 is a schematic representation of a system.
Figure 2:
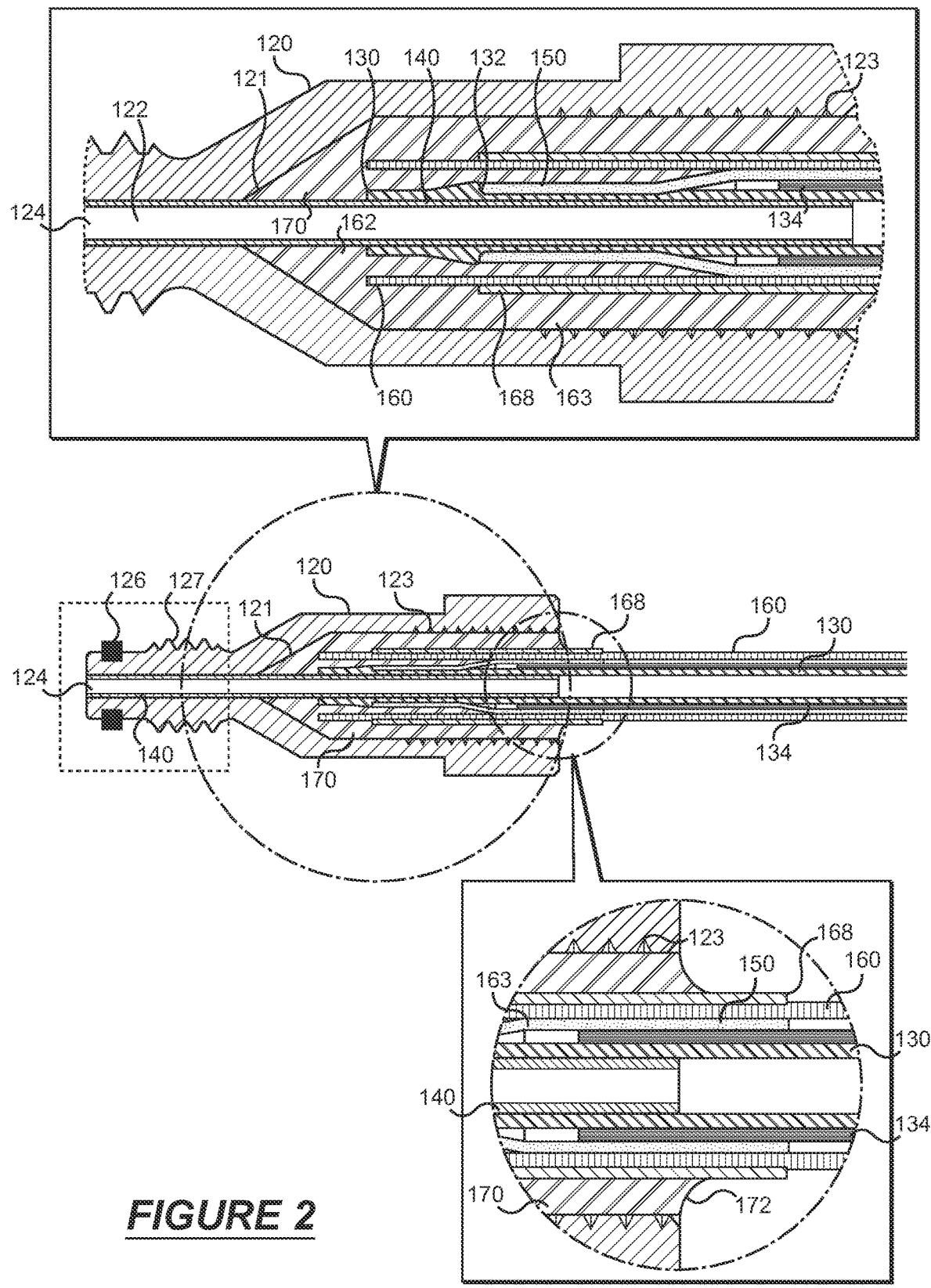
FIG. 2 is a schematic representation of the system.

As shown in FIGS. 1 and 2, a system 100 includes: a fluid distribution block 110; a fitting 120; an inner tube 130; a needle 140; a ferrule 150; an outer sleeve 160; and a volume of potting material 170.

The fitting 120: defines a cavity 121; defines a bore 122 extending from a proximal end of the fitting 120 to the cavity 121; includes a set of retention features 123 arranged about an inner wall of the cavity 121; and is coupled to the fluid distribution block 110.

The inner tube 130 defines a proximal tube section arranged within the cavity 121 of the fitting 120.

The needle 140: is arranged within the proximal tube section of the inner tube 130 and extends through the bore 122 of the fitting 120; and is configured to transfer a fluid from the fluid distribution block 110 through the inner tube 130 to increase pressure within the inner tube 130.

The ferrule 150: is arranged about the proximal tube section of the inner tube 130 within the cavity 121; compresses the proximal tube section of the inner tube 130 about the needle 140; and is offset from a proximal end of the inner tube 130.

The outer sleeve 160: concentrically encompasses the inner tube 130; defines a nominal sleeve diameter configured to increase responsive to increased pressure within the inner tube 130; and defines a proximal sleeve section forming an outer annular void 163 between the inner wall of the cavity 121 and an outer surface of the outer sleeve 160 and an inner annular void 162 between the needle 140 and an inner surface of the outer sleeve 160.

The volume of potting material 170 is arranged within the cavity 121 of the fitting 120 and configured to: occupy the inner annular void 162, the outer annular void 163, and the set of retention features 123 within the cavity 121 of the fitting 120; retain the proximal tube section of the inner tube 130, the needle 140, the ferrule 150, and the proximal sleeve section of the outer sleeve 160 within the fitting 120; and transfer tensile forces from the outer sleeve 160 into the fitting 120 and the fluid distribution block 110.

The outer sleeve 160 is operable in: a retracted position, wherein the outer sleeve 160 retracts to the nominal sleeve diameter, responsive to supply of fluid at a first fluid pressure to the inner tube 130 by the fluid distribution block 110, in the retracted position; and an expanded position, wherein the outer sleeve 160 expands to a target sleeve diameter, responsive to supply of fluid at a second fluid pressure to the inner tube 130 by the fluid distribution block 110 that expands the inner tube 130 and the outer sleeve 160 and increases tensile forces applied by the outer sleeve 160 onto the fluid distribution block 110, in the expanded position. The target sleeve diameter greater than the nominal sleeve diameter, and the second fluid pressure greater than the first fluid pressure.

2. Applications

Generally, the system 100 functions as a compact, lightweight, actuator operable in a retracted configuration and an expanded configuration in order to retract (or "pull") and extend a load coupled to the muscle actuator. More specifically, the system 100 includes an outer sleeve 160 (e.g., braided sleeve) configured to operate: in a retracted position responsive to supply of a nominal flow rate of a high-pressure fluid into an inner tube 130 (or "bladder") arranged within the outer sleeve 160; and an expanded position responsive to supply of a target flow rate, greater than the nominal flow rate, of the high-pressure fluid into the inner tube 130 to 1) increase a diameter of the outer sleeve 160 from a nominal sleeve diameter, 2) decrease a length of the outer sleeve 160 from a nominal sleeve length, and 3) transfer tensile forces from the outer sleeve 160 into a fluid distribution block 110 coupled to the inner tube 130 and the outer sleeve 160 to pull a load coupled to a proximal end of the inner tube 130. Accordingly, rather than a pull force of the load constrained to a fixed diameter of a cylindrical structure, the system 100 can output a greater pull force per unit fluid pressure according to: a fluid pressure within the inner tube 130; and a variable diameter of the outer sleeve 160.

The system 100 further includes a fitting 120: defining a cavity 121 configured to receive a proximal end of the inner tube 130; defining a bore 122 arranged within the fitting 120 and connecting an inlet port 124 at a proximal end of the fitting 120 to the cavity 121; and including a set of retention features 123 (e.g., undercuts) arranged about an inner wall of the cavity 121. The system 100 further includes a needle 140 (e.g., rigid tubular structure): arranged within a proximal end of the inner tube 130 and extending through the bore 122 within the fitting 120; and configured to transfer the high-pressure fluid supplied from the fluid distribution block 110 into an interior volume of the inner tube 130. The system 100 also includes a ferrule 150 (e.g., crimped ferrule): arranged about the inner tube 130; offset the proximal end of the inner tube 130; and compressing the inner tube 130 to retain the inner tube 130 about the needle 140 and define a transition region between an outer surface of the inner tube 130 and the ferrule 150.

The outer sleeve 160 is arranged about the inner tube 130 and extends within the cavity 121 of the fitting 120 to define: an outer annular void 163 between the inner wall of the cavity 121 and an outer surface of the outer sleeve 160; and an inner annular void between the needle 140 and an inner surface of the outer sleeve 160. Accordingly, the system 100 can then implement potting techniques (e.g., such as pouring, vacuum potting, and injection potting) to inject a volume of potting material 170 within the cavity 121 to occupy the inner annular void 162 and the outer annular void 163. The potting material 170 is configured to: retain the inner tube 130, the needle 140, the ferrule 150, and the outer sleeve 160 against the fitting 120; and transfer tensile forces from the outer sleeve 160—resulting from increased pressure in the inner tube 130—into the fitting 120 and therefore, into the fluid distribution block 110.

Therefore, the system can function as a high-pull force actuator, with minimal components, configured to output a target pull force according to: an internal pressure within the inner tube 130; a variable diameter of the outer sleeve 160; and twist directions braided strands (e.g., fibers) of the outer sleeve.

2.1 Applications: Internal Fluid Seal

The system 100 can trigger (e.g., via a controller) the fluid distribution block 110 to: supply the high-pressure fluid into an interior volume of the inner tube 130; expand the inner tube 130 responsive to increased pressure within the inner tube 130; and expand the outer sleeve 160 to transfer tensile forces into the fitting 120. In this example, during supply of the high-pressure fluid into the interior volume of the inner tube 130, the high-pressure fluid can leak (or "seep") into the cavity 121 of the fitting 120. In particular, the high-pressure fluid can flow into: an inner interstice at the inner annular void 162 between an inner surface of the inner tube 130 and an outer surface of the needle 140; and an outer interstice at the outer annular void 163 between the inner wall of the cavity 121 and the potting material 170 occupying the outer annular void 163.

The high-pressure fluid flowing through the inner interstice results in a concentration of stress at the transition region between the inner tube 130 and the ferrule 150 that forms a ramp 132 over the proximal end of the ferrule 150 functioning as an inner fluid seal configured to prevent the high-pressure fluid from flowing to an external environment. Additionally, the high-pressure fluid flowing through the outer interstice traverses through the set of retention features 123, about the inner wall of the cavity 121, which functions as an outer fluid seal, cooperating with the inner fluid seal, to prevent the high-pressure fluid from flowing to the external environment.

Therefore, rather than implementing additional fluid seal components (e.g., O-rings, end cap seals, diaphragm seals) into the fitting 120 to prevent the high-pressure fluid leaking from the fitting 120, the system 100 includes the potting material 170: cooperating with a transition region between the inner tube 130 and the ferrule 150 to form a primary fluid seal for the fitting 120; and cooperating with the retention features in the cavity 121 to form a secondary fluid seal for the fitting 120. Accordingly, the system 100 can then trigger the fluid distribution block 110 to: regulate (e.g., increase, decrease) flow rate of the high-pressure fluid into the inner tube 130; and transition between an extended position and a retracted position of the load coupled to the fluid distribution block 110.

2.2 Applications: Abrasion Resistance

The system 100 can further include an intermediate tube 134: interposed between the inner tube 130 and the outer sleeve 160; and configured to shield the inner tube 130 from abrasion and extrusion against the outer sleeve 160 during expansion and retraction of the inner tube 130 responsive to increased pressure within the inner tube 130. In one example, the inner tube 130: is formed of a low-durometer (e.g., between 20 and 40 Shore A) elastomeric material; and defines an inner tube 130 diameter. Additionally, the outer sleeve 160: is formed of a high-durometer (e.g., greater than 60 Shore A) elastomeric material; defines an intermediate tube 134 diameter concentric with the inner tube 130 diameter of the inner tube 130; and is interposed within a nominal gap between the inner tube 130 and the outer sleeve 160.

Therefore, during repeated expansion and contraction of the inner tube 130, the intermediate sleeve 168 functions as a shield (or "wear plate") to prevent abrasion between an outer surface of the inner tube 130 and an inner surface of the outer sleeve 160 and thus, prevent wear of the inner tube 130 during repeated (e.g., greater than one million cycles) retraction and expansion of the inner tube 130.

3. Fitting

Figure 3:
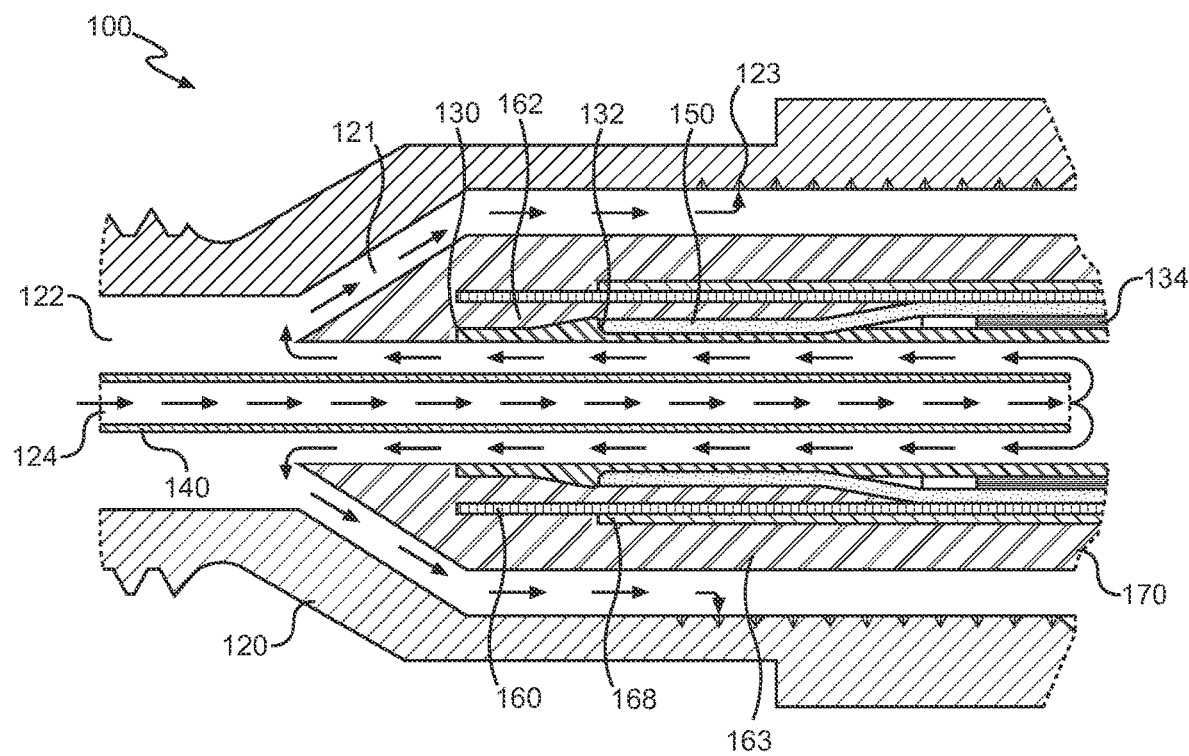
FIG. 3 is a schematic representation of the system.

Generally, as shown in FIGS. 1, 2, and 3, the system 100 includes a fitting 120 functioning as an interface between an inner tube 130 and a fluid distribution block 110 (e.g., manifold) supplying a high-pressure fluid (3000 pounds per square inch) into the inner tube 130. More specifically, the fitting 120: includes a distal end coupled to a proximal section of an inner tube 130 (e.g., elastomeric tube) and an outer sleeve 160 (e.g., braided sleeve); includes a proximal end coupled to a fluid distribution block 110 (e.g., manifold) configured to supply a high-pressure fluid (e.g., synthetic fluid, mineral oil-based fluid) into the inner tube 130; and is configured to transfer tensile forces (e.g., hoop stresses) about the inner tube 130 and the outer sleeve 160 into the fluid distribution block 110 responsive to increased pressure at the inner tube 130.

In one implementation, the fitting 120 can be formed of a rigid material (e.g., stainless steel, aluminum) and includes: a block-mounting section configured to couple to a fluid distribution block 110; and a tube-mounting section configured to couple to the inner tube 130 and the outer sleeve 160. In this implementation, the block-mounting section defines a substantially tapered geometry and includes: an inlet port 124 arranged at a proximal end of the fitting 120 and configured to couple to an outlet port (e.g., high-pressure fluid outlet port) of the fluid distribution block 110; a groove 125 inset from an outer surface of the block-mounting section and offset from the inlet port 124; and a gasket 126 (e.g., elastomeric gasket) arranged about the groove 125 and configured to prevent flow of the fluid supplied from the fluid distribution block 110 across the outer surface of the fitting 120. In one example, the block-mounting section also includes a set of threads 127: arranged about the outer surface of the block section offset from the groove 125; configured to retain the fitting 120 within the fluid distribution block 110; and configured to transfer tensile forces from the inner tube 130 and the outer sleeve 160 to the fluid distribution block 110 responsive to increase in fluid pressure at the inlet port 124.

In this implementation, the tube-mounting section defines a substantially cylindrical geometry and includes: a cavity 121 (e.g., cylindrical volume) arranged at a distal end of the fitting 120 and configured to receive proximal ends of the inner tube 130 and the outer sleeve 160; a bore 122 (e.g., cylindrical channel) extending from the inlet port 124 at the proximal end of the fitting 120 to the cavity 121 and the distal end of the fitting 120; and a set of retention features 123 (e.g., undercuts) arranged about an inner wall of the cavity 121 configured to prevent flow of high-pressure fluid-leaked within the cavity 121—to an outside environment. In one example, the set of retention features 123 extend from a distal end of the fitting 120 to a section (e.g., a midpoint) of the cavity 121 offset from the proximal end of the fitting 120. In this example, each retention feature, in the set of retention features 123: includes an undercut formed inset from the inner wall of the first cavity; and defines a triangular geometry.

Therefore, the system 100 includes the fitting 120: to function as an interface between the inner tube 130 and the fluid distribution block 110; to function as a liquid seal to direct a high-pressure fluid into the inner tube 130; and to function as a load-bearing element to transfer tensile forces across the outer sleeve 160 into the fluid distribution block 110 during operation of the system 100.

3.1 Needle

In one implementation, as shown in FIG. 2, the system 100 further includes a needle 140 (e.g., hollow-rigid tubing): arranged within the bore 122 of the fitting 120; extending from the inlet port 124 at the proximal end of the fitting 120 into the cavity 121 at the distal end of fitting; inserted within the inner tube 130 at the cavity 121; and configured to transfer a high-pressure fluid supplied at the fluid distribution block 110 into the inner tube 130. In this implementation, the needle 140 is inserted within the inner tube 130 such that a proximal end of the inner tube 130 is arranged offset (e.g., 0.25 inch offset) from a proximal end of the needle 140 in order to locate the proximal tube section entirely within the cavity 121 of the fitting 120.

Thus, the needle 140 functions as an interface to transfer a high-pressure fluid supplied from the fluid distribution block 110 into the proximal tube section of the inner tube 130 arranged within the tube-mounting section of the fitting 120.

4. Inner Tube

In one implementation, as shown in FIGS. 2 and 3, the system 100 includes an inner tube 130: formed of a low-durometer (e.g., between 20 and 40 Shore A) elastomeric material; defining a nominal tube length (e.g., four inches); defining a proximal tube section configured to couple within a cavity 121 of a primary fitting 120; and defining a distal tube section configured to couple within a secondary cavity of a secondary fitting. As described above, the proximal tube section: is coupled to the needle 140 within the cavity 121 of the fitting 120; and is configured to receive a high-pressure fluid into an interior volume of the inner tube 130 from the needle 140.

In this implementation, the primary fitting 120 can be coupled to a primary fluid distribution block and the secondary fitting can be coupled to a secondary fluid distribution block and/or a mounting block 112 in order to form a trapped pressure volume within the inner tube 130. Accordingly, the inner tube 130: defines a nominal tube diameter (e.g., 0.08 inches) responsive to supply of fluid at a baseline fluid pressure (e.g., less than 3000 pounds per square inch) into the inner tube 130 from the fluid distribution block 110; and defines a target tube diameter (e.g., 0.099 inches) responsive to supply of fluid at a target fluid pressure (e.g., greater than 3000 pounds per square inch) into the inner tube 130 from the fluid distribution block 110. Thus, as the diameter of the inner tube 130 transitions from the nominal tube diameter to the target tube diameter, the nominal tube length (e.g., four inches) decreases to a target tube length (e.g., 3.5 inches).

Therefore, the inner tube 130 can function as a high-pressure (e.g., greater than 3000 pounds per square inch) bladder configured to operate in a retracted position and an expanded position responsive to supply of fluid at high-pressure fluid into the inner tube 130 by the fluid distribution block 110.

4.1 Crimped Ferrule

Figure 5:
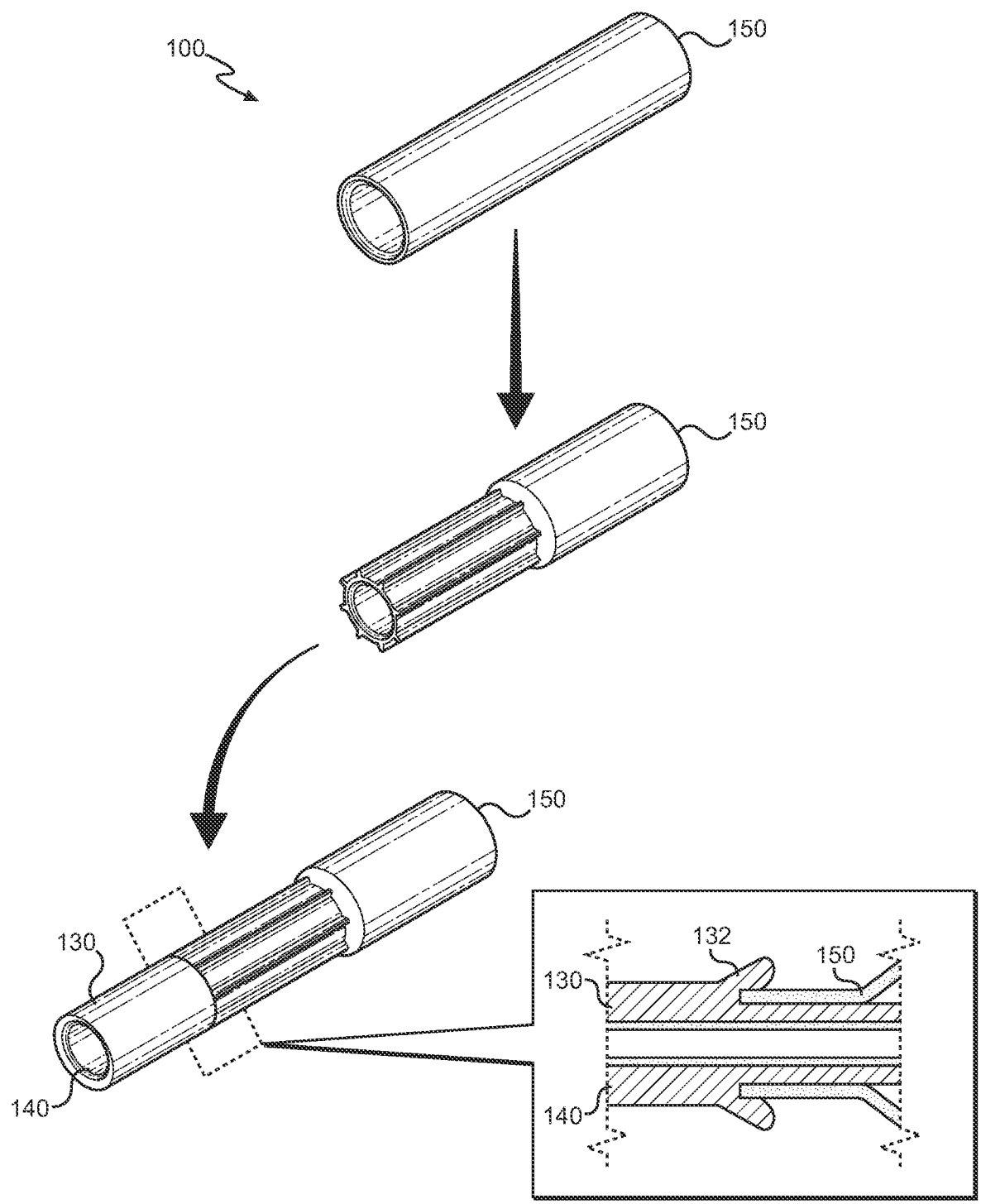
FIG. 5 is a schematic representation of the system.

In one implementation, as shown in FIGS. 2 and 5, the system 100 includes a ferrule 150 (e.g., crimped ferrule): arranged about the proximal tube section of the inner tube 130 within the cavity 121 of the fitting 120; and compressing the proximal tube section of the inner tube 130, offset from a proximal end of the inner tube 130, against the needle 140. In particular, the ferrule 150 defines a substantially cylindrical structure that is crimped about the proximal tube section to form a crimped section and an uncrimped section. In this implementation, the crimped section: is crimped about the proximal tube section to define a first ferrule 150 diameter concentric about a diameter of the proximal tube section of the inner tube 130; compresses the proximal tube section of the inner tube 130 against an outer surface of the needle 140 in order to form concentration of stress at a transition region between an outer surface of the inner tube 130 and the ferrule 150; and retains the needle 140 coupled to the inner tube 130 to supply flow of high-pressure fluid into the inner tube 130 by the fluid distribution block 110.

In one example, crimping techniques—such as rotary crimping, press crimping, electric crimping, hand crimping—can be implemented to form the crimped section and thus: define a first ferrule 150 diameter substantially approximating (e.g., +/−0.001 inches) the nominal tube diameter; and form a press fit (or interference fit) of the ferrule 150 about the inner tube 130 to prevent flow of fluid through an interstice between the needle 140 and an inner surface of the inner tube 130 at the proximal tube section.

More specifically, the concentration of stress at the transition region forms a ramp 132 of the proximal tube section over a proximal end of the crimped section of the ferrule 150 configured to prevent flow of fluid through an interstice between the ramp 132 and the ferrule 150.

Additionally, the uncrimped section: defines a second ferrule 150 diameter, greater than the first ferrule 150 diameter, concentric about the diameter of the proximal tube section of the inner tube 130; forms a nominal gap between the inner tube 130 and the outer sleeve 160 enclosing the inner tube 130; and terminates proximal a distal end of the fitting 120 to locate the ferrule 150 entirely within the cavity 121 of the fitting 120. Accordingly, the inner tube 130 is configured to, responsive to supply of a target fluid pressure by the fluid distribution block 110 into the inner tube 130: expand to reduce the nominal gap between the inner tube 130 and the outer sleeve 160; expand a nominal sleeve diameter of the outer sleeve 160 to a target sleeve diameter; and transfer tensile forces from the outer sleeve 160 into the fitting 120.

Therefore, the ferrule 150: retains the inner tube 130 compressed against the needle 140 within the cavity 121 of the fitting 120; maintains a nominal gap between the inner tube 130 and the outer sleeve 160; and forms a ramp 132 of the proximal tube section over a proximal end of the ferrule 150 to function as a gasket to prevent flow of liquid through an interstice between the ramp 132 and the ferrule 150.

4.2 Intermediate Tube

In one implementation, as shown in FIGS. 1 and 2, the system 100 further includes an intermediate tube 134: interposed between the inner tube 130 and the outer sleeve 160; and offset from the proximal tube section of the inner tube 130. As described above, the inner tube 130 is configured to expand to reduce the nominal gap between the inner tube 130 and the outer sleeve 160 responsive to supply of a target fluid pressure by the fluid distribution block 110 into the inner tube 130. Accordingly, an outer surface of the inner tube 130 expands to contact an inner surface of the outer sleeve 160, which results in abrasion of the outer surface of the inner tube 130 during repeated retraction and expansion of the inner tube 130. Thus, the intermediate tube 134 is configured to prevent abrasion of the inner tube 130 during repeated retraction and expansion of the inner tube 130.

In one example, the inner tube 130: is formed of a low-durometer (e.g., between 20 and 40 Shore A) elastomeric material; and defines an inner tube 130 diameter. Additionally, the outer sleeve 160: is formed of a high-durometer (e.g., greater than 60 Shore A) elastomeric material; defines an intermediate tube 134 diameter concentric with the diameter of the inner tube 130; is interposed within the nominal gap between the inner tube 130 and the outer sleeve 160; and is configured to shield the inner tube 130 from extrusion through the outer sleeve 160 and abrasion from the outer sleeve 160 against the outer surface of the inner tube 130 during increased pressure within the inner tube 130. Accordingly, the intermediate tube 134 prevents the inner tube 130 from impregnating interstices between fibers across an inner surface of the outer sleeve 160—during expansion of the inner tube 130 within the outer sleeve—thereby, preventing abrasion between the inner tube 130 and the outer sleeve 60.

Therefore, the system 100 includes an intermediate sleeve 168: arranged within a nominal gap between the inner tube 130 and the outer sleeve 160; and functioning as a shield to prevent abrasion between an outer surface of the inner tube 130 and an inner surface of the outer sleeve 160 and thus, prevent wear of the inner tube 130 during repeated retraction and expansion of the inner tube 130.

The system 100 can implement the structure described above to form multiple (e.g., n-number) of intermediate tubes 134 interposed between the inner tube 130 and the outer sleeve 160 to shield the inner tube 130 from abrasion contact with the inner surface of the outer sleeve 160.

5. Outer Sleeve+Annular Voids

In one implementation, as shown in FIGS. 2 and 3, the system 100 includes an outer sleeve 160 (e.g., braided sleeve): concentrically encompassing the inner tube 130; and defining a nominal sleeve diameter configured to expand responsive to expansion of the inner tube 130, as described above, resulting from increased pressure within the inner tube 130. In this implementation, the outer sleeve 160 includes a proximal sleeve section arranged within the cavity 121 of the fitting 120 to: form an outer annular void 163 between an inner wall of the cavity 121 and an outer surface of the outer sleeve 160; and form an inner annular void 162 between the needle 140 and an inner surface of the outer sleeve 160. Additionally, as described below, the system 100 can include a volume of potting material 170: arranged within the cavity 121 to occupy the inner annular void 162 and the outer annular void 163; and retain the inner sleeve and the outer sleeve 160 to the fitting 120.

Thus, in response to supplying a target fluid pressure within the inner tube 130 by the fluid distribution block 110, the outer sleeve 160 transitions from a retracted position to an expanded position to transfer tensile forces across the outer sleeve 160 into the fitting 120 and thus, into the fluid distribution block 110.

The system 100 can implement the structure described above to form multiple (e.g., n-number) of additional sleeves (e.g., braided sleeves) interposed between the inner tube 130 and the outer sleeve 160 to increase pressure tolerances of the system 100 during retraction and expansion of the outer sleeve 160. Accordingly, the outer sleeve can further define a distal sleeve section arranged within a secondary cavity of a secondary fitting and defining: a second outer annular void between an inner wall of the secondary cavity and the outer sleeve; and a secondary inner annular void between the needle and the outer sleeve.

5.1 Potting Material

In one implementation, potting techniques—such as pouring, vacuum potting, and injection potting—can be implemented to locate a volume of potting material 170 within the cavity 121 to occupy the outer annular void 163 and the inner annular void 162 and thus, retain the inner tube 130 and the outer sleeve 160 within the cavity 121 of the fitting 120. In one example, the volume of potting material 170 can be arranged within the cavity 121 by: injecting the potting material 170 into the outer annular void 163 such that, the potting material 170 flows through the outer annular void 163 and into the inner annular void 162 to fill the cavity 121 of the fitting 120; and curing the potting material 170 following a target duration of time.

More specifically, the potting material 170 flows into the outer annular void 163 to: impregnate interstices between fibers across the outer surface of the outer sleeve 160 to bond the outer sleeve 160 to the potting material 170 and thus, retain the outer sleeve 160 within the cavity 121 of the fitting 120; and fill the set of retention features 123 (i.e., fill undercuts formed into the inner wall of the cavity 121) within the fitting 120. In one example, the potting material 170 occupies the outer annular void 163 to form a radiused transition 172 (e.g., a fillet): extending from a distal end of the fitting 120 to an outer surface of the outer sleeve 160; and configured to reduce a stress concentration proximal the distal end of the fitting 120 during expansion of the outer sleeve 160. Therefore, the radiused transition 172 functions as a buffer zone extending from the distal end of the fitting 120 to an outer surface of the outer sleeve 160 that reduces stress concentrations at the distal end of the fitting.

Additionally, the potting material 170 flows into the inner annular void 162 to: impregnate interstices between fibers across the inner surface of the outer sleeve 160 to bond the outer sleeve 160 to the potting material 170 and retain the outer sleeve 160 within the cavity 121 of the fitting 120;

retain the needle 140, the inner tube 130, and the ferrule 150 within the cavity 121 of the fitting 120; and cooperate with the ferrule 150 to form the concentration of stress at the transition region between an outer surface of the inner tube 130 and the distal end of the ferrule 150.

Therefore, the system 100 includes a volume of potting material 170: occupying the cavity 121 of the fitting 120 to retain the inner tube 130 and the outer sleeve 160 within the fitting 120; and functioning as a load-bearing element configured to transfer tensile forces across the outer sleeve 160—from retraction and expansion of the outer sleeve 160—into the fitting 120 and therefore, transfer these tensile forces into the fluid distribution block 110.

5.2 Intermediate Sleeve

In one implementation, as shown in FIGS. 2 and 3, the system 100 can include an intermediate sleeve 168 (e.g., aramid, carbon fiber, fiberglass): arranged about the proximal sleeve section of the outer sleeve 160; and cooperating with the potting material 170 to bond the outer sleeve 160 to the potting material 170 and to retain the outer sleeve 160 within the cavity 121 of the fitting 120. In this implementation, the outer sleeve 160 includes a primary set of strands 164: formed of a substantially non-abrasive material (e.g., liquid crystal polymer); and defining a primary surface roughness (e.g., between 4 and 16 microinches). For example, the set of strands can include an elastomeric coating 167 (e.g., acrylic coating, polyurethane coating, silicone coating, butyl coating) to define the primary surface roughness across the intermediate sleeve 168.

Additionally, the intermediate sleeve 168 includes a secondary set of strands 165: interposed between the proximal sleeve section of the outer sleeve 160 and the inner wall of the cavity 121 of the fitting 120; formed of an abrasive material (e.g., aramid, carbon fiber, fiberglass); and defining a secondary surface roughness (e.g., between 1000 and 2000 microinches) greater than the primary surface roughness. During injection of the potting material 170 into the outer annular void 163 as described above, rather than the potting material 170 impregnating interstices between fibers across the outer surface of the outer sleeve 160, the potting material 170 impregnates interstices between fibers across an outer surface of the intermediate sleeve 168, thereby bonding the intermediate sleeve 168 and the outer sleeve 160 to the potting material 170 and retaining the intermediate sleeve 168 and the outer sleeve 160 within the cavity 121 of the fitting 120.

Therefore, the system 100 can include the intermediate sleeve 168: interposed between the outer sleeve 160 and the inner wall of the cavity 121 of the fitting 120; and functioning as a mechanical bonding agent (or "surface primer") cooperating with the potting material 170 injected within the outer annular void 163 to retain the outer sleeve 160 within the cavity 121 of the fitting 120.

5.2 Braids+Coating

Figure 4:
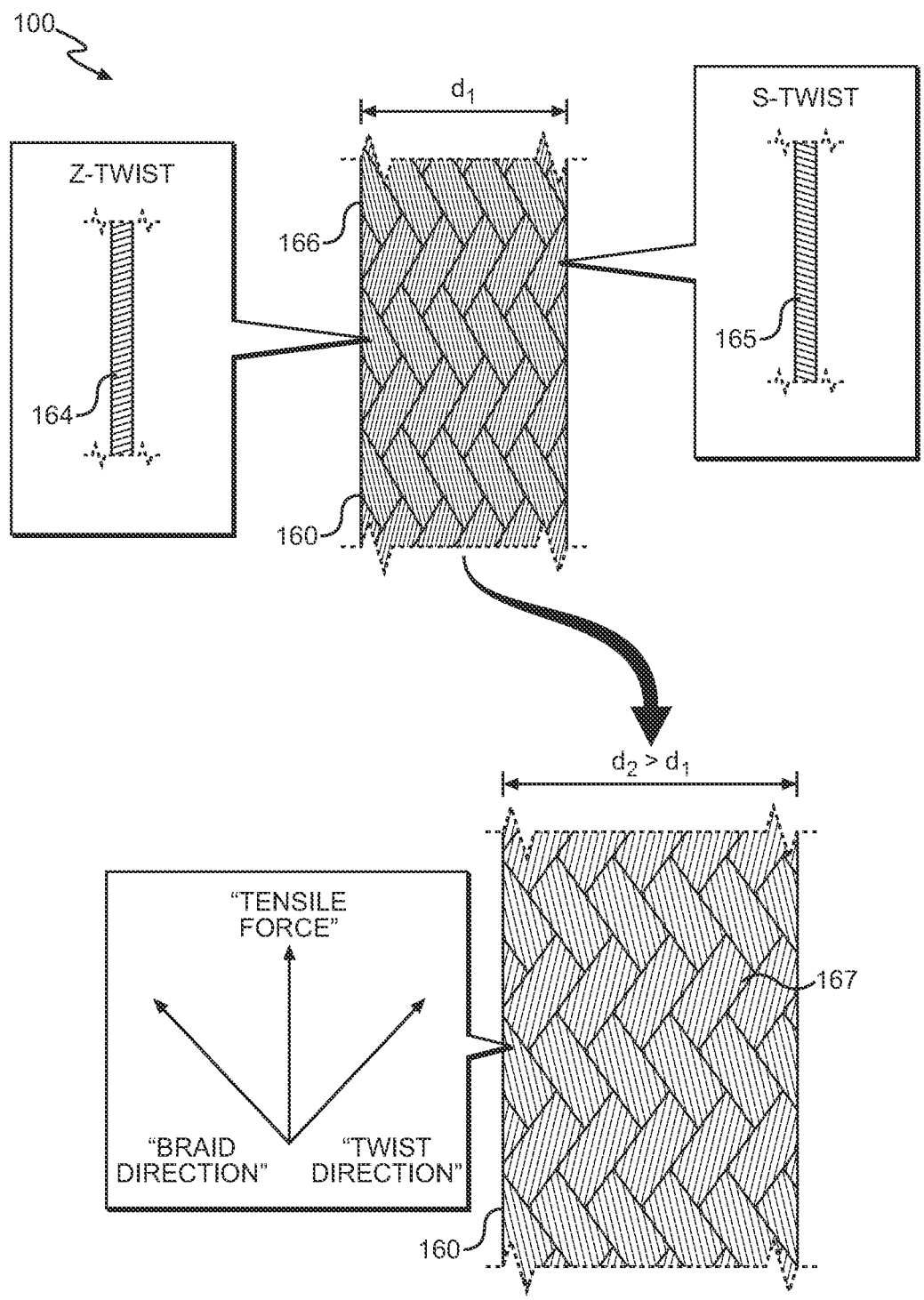
FIG. 4 is a schematic representation of the system.

In one implementation, as shown in FIG. 4, the outer sleeve 160 includes a braided structure 166 (e.g., diamond braid, biaxial braid, helical braid): including a set of braided strands forming a substantially cylindrical configuration about the inner tube 130; and configured to transfer tensile forces across the outer sleeve 160—responsive to increased pressure within the inner tube 130—in an axial direction toward the fitting 120 and into the fluid distribution block 110. In this implementation, the braided strands, in the set of braided strands, can be formed of metallic, non-polymer, liquid crystal polymers, and non-organic fibers, strands, wire etc.

In one example, the outer sleeve 160 includes: a primary set of strands 164; and a secondary set of strands 165 cooperating with the primary set of strands 164 to form a helical braided structure 166. The primary set of strands 164: includes groups of fibers twisted in a primary direction (e.g., Z-twist, 45-degrees); and are braided into a primary helical pattern according to a direction orthogonal (e.g., 135-degrees) to the primary direction of the groups of fibers. The secondary set of strands 165: includes groups of fibers twisted in a secondary direction (e.g., S-twist, −45 degrees); are braided into a secondary helical pattern according to a direction orthogonal (e.g., 45-degrees) to the secondary direction of the groups of fibers; and cooperates with the primary set of strands 164 to form the helical braided structure 166 enclosing the inner tube 130.

In this example, each strand—in the primary set of strands 164 and the secondary set of strands 165—can include an elastomeric coating 167 (e.g., acrylic coating, polyurethane coating, silicone coating, butyl coating) configured to: retain the strands in the helical braided structure 166 across a target length of the outer sleeve 160; reduce friction between adjacent strands to increase flexibility of the outer sleeve 160 during expansion of the outer sleeve 160 resulting from increased pressure in the inner tube 130; and defining the primary surface roughness (e.g., between 4 and 16 microinches), as described above.

Accordingly, during expansion of the outer sleeve 160 responsive to increased pressure in the inner tube 130, the orthogonal relationship between the primary set of strands 164 and the primary helical pattern and the orthogonal relationship between the secondary set of strands 165 and the secondary helical pattern cooperate to direct (or "guide") tensile forces in an axial direction across the outer sleeve 160 into the fitting 120 and thus, into the fluid distribution block 110.

Therefore, the system 100 can include a braided outer sleeve 160: enclosing the inner tube 130; and functioning as a tension guide to direct tensile forces across the outer sleeve 160—resulting from hoop stresses about the outer sleeve 160 during increased pressure within the inner tube 130—in an axial direction toward the fitting 120 and thus, into the fluid distribution block 110.

6. Leak Path+Seal

In one implementation, as shown in FIG. 3, the system 100 can trigger the fluid distribution block 110 to direct a high-pressure fluid (e.g., 3000 pounds per square inch) through the needle 140 within the fitting 120 and into the inner tube 130 in order to increase pressure within the inner tube 130 and thus, transition the outer sleeve 160 from a retracted position and into an expanded position. In this implementation, during flow of the high-pressure fluid into the inner tube 130, the high-pressure fluid can leak (or "seep") from an interior volume of the inner tube 130 and into the cavity 121 of the fitting 120. Accordingly, the system 100 implements the structure and assembly methods described above to prevent flow (or "seeping") of high-pressure fluid from the cavity 121 of the fitting 120 to an outside environment, which can result in failed operation of the system 100.

During operation of the system 100, the high-pressure fluid can leak into the cavity 121 of the fitting 120: through a primary interstice between an outer surface of the needle 140 and an inner surface of the inner tube 130; and into the inner annular void 162 and the outer annular void 163 within the cavity 121. In particular, the high-pressure fluid flows into an inner interstice—within the inner annular void 162—between an inner section of potting material 170 adjacent the transition region between the inner tube 130 and the ferrule 150. This flow of high-pressure fluid through the primary interstice cruises a concentration of stress into the transition region that cooperates with applied pressure to the inner tube 130 by the ferrule 150 to form the ramp 132 over the proximal end of the ferrule 150. Accordingly, the ramp 132 can then function as a gasket to prevent flow of fluid past the transition region between the inner tube 130 and the ferrule 150 and thus, prevent flow (or "seeping") of fluid to an outside environment.

Additionally, the high-pressure fluid flows into an outer interstice—within the outer annular void 163—between an outer section of potting material 170 and the inner wall of the cavity 121 of the fitting 120. As the high-pressure fluid material flows through the outer interstice toward the distal end of the fitting 120, the high-pressure fluid occupies the set of retention features 123 (e.g., undercuts) along the inner wall of the cavity 121, which prevents the high-pressure fluid from leaking to the outside environment through the outer annular void 163.

Therefore, the system 100 includes: an inner fluid seal (or "gasket") within the inner annular void 162 of the cavity 121 formed by concentration of stresses resulting from flow of high-pressure fluid into the inner annular void 162 cooperating with the transition region between the inner tube 130 and the ferrule 150; and an outer fluid seal (or "gasket") within the outer annular void 163 of the cavity 121 formed by the set of retention features 123 about the inner wall of the cavity 121 cooperating with the outer section of potting material 170 within the outer annular void 163. Accordingly, the inner fluid seal and the outer fluid seal cooperate to prevent high-pressure fluid, seeping into the cavity 121 of the fitting 120, from flowing to an outside environment.

7. Single-Acting Actuator

Figure 6A:
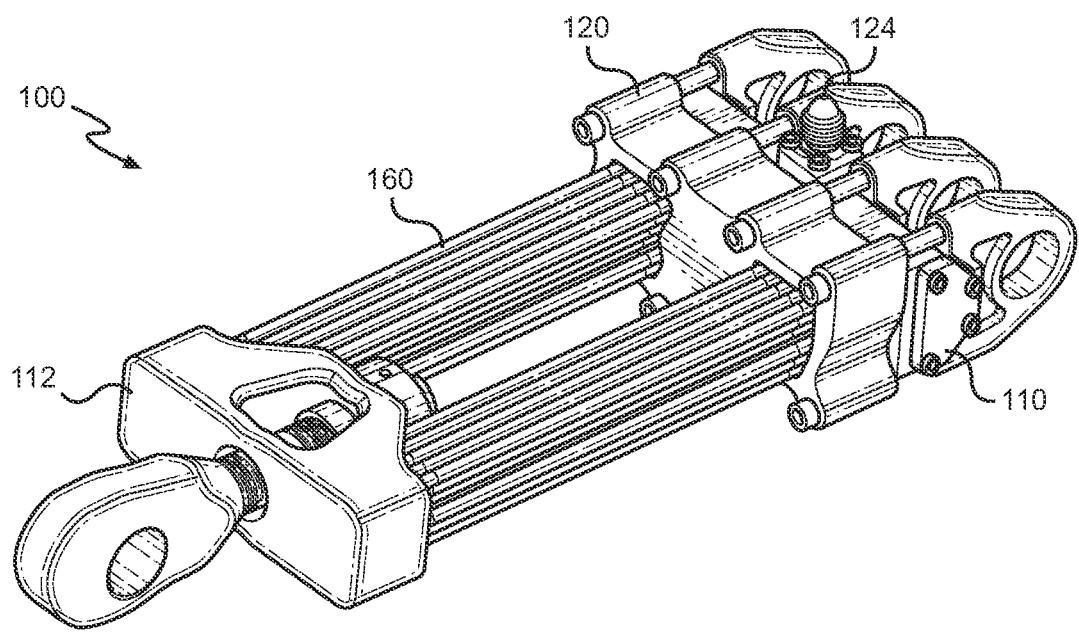
FIGS. 6A and 6B are schematic representations of the system.
Figure 6B:
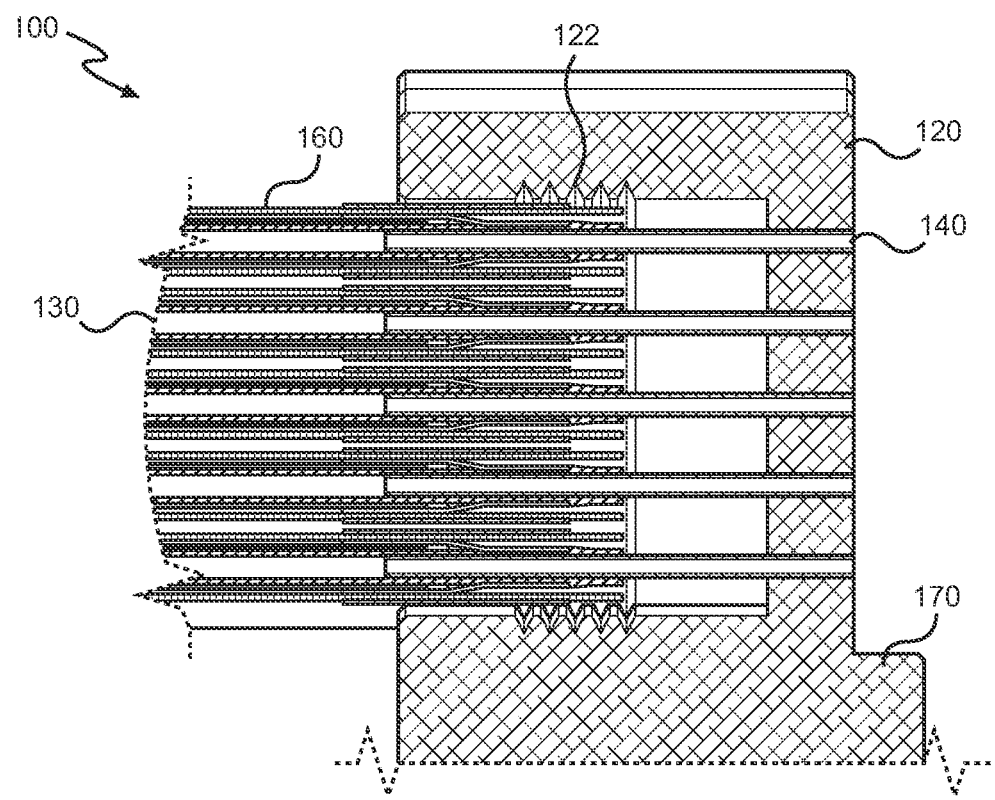

In one implementation, as shown in FIGS. 1, 6A, and 6B, the system 100 includes: a primary fitting 120 configured to couple the proximal tube section of the inner tube 130 to a fluid distribution block 110; and a secondary fitting configured to couple a distal tube section of the inner tube 130 to a mounting block 112. More specifically, the system 100 can implement the structure and assembly techniques described above to: retain proximal ends of the inner tube 130 and the outer sleeve 160 within the primary fitting 120; and retain distal ends of the inner tube 130 and the outer sleeve 160 within the secondary fitting.

However, rather than including a needle 140 within the secondary fitting to supply the high-pressure fluid into the interior volume of the inner tube 130, the system 100 includes a stopper: arranged within the distal tube section of the inner tube 130 and extending through a secondary bore of the secondary fitting; and forming a seal configured to block flow of the high-pressure fluid, within the interior volume of the inner tube 130, outwardly from a distal end of the inner tube 130.

In this implementation, the primary fitting 120 is coupled to the fluid distribution block 110: including a primary coupling element (e.g., eyelet) configured to mechanically couple the fluid distribution block 110 to a load; and including an outlet port configured to supply the high-pressure fluid in a first direction into the interior volume of the inner tube 130 via the proximal end of the inner tube 130. Additionally, the secondary fitting is coupled to the mounting block 112: including a secondary coupling element (e.g., eyelet) configured to couple the mounting block 112 to a mechanical reference; and configured to prevent flow of the high-pressure fluid in a second direction, opposite the first direction, outwardly from the distal end of the inner tube 130.

The system 100 can then: trigger the fluid distribution block 110 to supply a nominal flow rate of high-pressure fluid in the first direction into the interior volume of the inner tube 130 to expand the outer sleeve 160 to a nominal sleeve diameter; and trigger the fluid distribution block 110 to supply a target flow rate, greater than the nominal flow rate, of high-pressure fluid in the first direction into the interior volume of the inner tube 130 to expand the outer sleeve 160 to a target sleeve diameter, greater than the nominal sleeve diameter. Accordingly, the fluid distribution block 110 cooperates with the mounting block 112 to form a single-acting actuator. The system 100 can alternate between flow of the high-pressure fluid in the nominal flow rate and the target flow rate to expand and retract the outer sleeve 160 and thus, extend and retract the load coupled to the primary coupling element.

Therefore, the system 100 can: selectively adjust flow of the high-pressure fluid in a single direction within the interior volume of the inner tube 130 at the proximal end of the inner tube 130 to adjust (or "regulate") pressure within the interior volume of the inner tube 130 and thus, adjust applied tensile forces applied to the load coupled to the primary coupling element.

Additionally, the system 100 can include an enclosure: configured to contain the inner tube 130 and the outer sleeve 160; locating the primary coupling element at a proximal end of the enclosure; and locating the secondary coupling element at a distal end of the enclosure.

7.1 Double Acting Actuator

In one implementation, the system 100 includes: a primary fitting 120 configured to couple the proximal tube section of the inner tube 130 to a primary fluid distribution block; and a secondary fitting configured to couple a distal tube section of the inner tube 130 to a secondary fluid distribution block. More specifically, the system 100 can implement the structure and assembly techniques described above to: retain proximal ends of the inner tube 130 and the outer sleeve 160 within the primary fitting 120; and retain distal ends of the inner tube 130 and the outer sleeve 160 within the secondary fitting.

In this implementation, the primary fitting 120 is coupled to a primary fluid distribution block: including a primary coupling element (e.g., eyelet) configured to mechanically couple the primary fluid distribution block to a load; and including a primary outlet port configured to supply a high-pressure fluid in a first direction into the interior volume of the inner tube 130 via the proximal end of the inner tube 130. Additionally, the secondary fitting is coupled to a secondary fluid distribution block: including a secondary coupling element (e.g., eyelet) configured to mechanically couple the secondary fluid distribution block to a mechanical reference; and including a secondary outlet port configured to direct a high-pressure fluid within the interior volume of the inner tube 130 in a second direction, opposite the first direction, into the secondary fluid distribution block via the distal end of the inner tube 130.

The system 100 can then: trigger the primary fluid distribution block to supply the high-pressure fluid in the first direction into the interior volume of the inner tube 130 to expand the outer sleeve 160; and trigger the secondary fluid distribution block to direct the high-pressure fluid in the second direction into the secondary fluid distribution block to retract the outer sleeve 160. Accordingly, the primary fluid distribution block cooperates with the secondary fluid distribution block to form a double-acting actuator to expand and retract the outer sleeve 160 and thus, extend and retract the load coupled to the primary coupling element.

Therefore, the system 100 can selectively adjust flow of the high-pressure fluid in two directions within the interior volume of the inner tube 130 at proximal and distal ends of the inner tube 130 to adjust (or "regulate") pressure within the interior volume of the inner tube 130 and thus, adjust applied tensile forces applied to the load coupled to the primary coupling element.

Additionally, the system 100 can include an enclosure: configured to contain the inner tube 130 and the outer sleeve 160; locating the primary coupling element at a proximal end of the enclosure; and locating the secondary coupling element at a distal end of the enclosure.

7.3 Variable Recruitment Actuation

In one implementation, as shown in FIGS. 6A and 6B, the system 100 can include: a housing including a set of inlet ports 124 and configured to couple to a fluid distribution block 110; a set of inner tubes 130 including a proximal end arranged within the housing and coupled to the set of inlet ports 124 to receive a high-pressure fluid within an interior volume of each inner tube 130, in the set of inner tubes 130; and a set of outer sleeves 160 encircling the set of inner tubes 130 and configured to expand responsive to increased pressure within the set of inner tubes 130. In this implementation, the system 100 can implement the structure and assembly techniques described above to retain proximal ends of the set of inner tubes 130 and the set of outer sleeve 160s within the housing.

The system 100 can then: trigger the fluid distribution block 110 to supply a nominal flow rate of high-pressure fluid in the first direction into the interior volume of the set of inner tubes 130 to expand the set of outer sleeve 160s to a nominal sleeve diameter; and trigger the fluid distribution block 110 to supply a target flow rate, greater than the nominal flow rate, of high-pressure fluid in the first direction into the interior volume of the set of inner tubes 130 to expand the set of outer sleeve 160s to a target sleeve diameter, greater than the nominal sleeve diameter.

Therefore, the housing, the set of inner tubes 130, and the set of outer sleeve 160s cooperate to form a variable recruitment actuator configured to transfer tensile forces across the set of outer sleeve 160s into the housing and thus, into the fluid distribution block 110 coupled to the load.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:
1. A system comprising:
   a first fluid distribution block;
   a first fitting:
      defining a first cavity;
      defining a first bore extending from a proximal end of the first fitting to the first cavity;
      comprising a first set of retention features arranged about an inner wall of the first cavity; and
      coupled to the first fluid distribution block;
   an inner tube defining a proximal tube section arranged within the first cavity of the first fitting;
   a first needle:
      arranged within the proximal tube section of the inner tube and extending through the first bore of the first fitting; and
      configured to transfer a fluid from the first fluid distribution block into the inner tube to increase pressure within the inner tube;
   a first ferrule:
      arranged about the proximal tube section of the inner tube within the first cavity; and
      compressing the proximal tube section of the inner tube about the first needle, the first ferrule offset from a proximal end of the inner tube;
   an outer sleeve:
      concentrically encompassing the inner tube;
      defining a nominal sleeve diameter configured to expand responsive to increased pressure within the inner tube; and
      defining a proximal sleeve section forming:
         a first outer annular void between the inner wall of the first cavity and an outer surface of the outer sleeve; and
         a first inner annular void between the first needle and an inner surface of the outer sleeve; and
   a first volume of potting material arranged within the first cavity of the first fitting and configured to:
      occupy the first inner annular void, the first outer annular void, and the first set of retention features within the first cavity of the first fitting;
      retain the proximal tube section of the inner tube, the first needle, the first ferrule, and the proximal sleeve section of the outer sleeve within the first fitting; and
      transfer tensile forces from the outer sleeve to the first fitting, the first fitting transferring tensile forces from the first volume of potting material into the first fluid distribution block.

2. The system of claim 1, wherein the outer sleeve is operable in:

a retracted position, the outer sleeve retracted to the nominal sleeve diameter, responsive to supply of fluid at a first fluid pressure to the inner tube by the first fluid distribution block, in the retracted position; and an expanded position, the outer sleeve expanded to a first sleeve diameter, responsive to supply of fluid at a second fluid pressure to the inner tube by the first fluid distribution block that expands the inner tube and the outer sleeve and increases tensile forces applied by the outer sleeve onto the first fluid distribution block, in the expanded position, the first sleeve diameter greater than the nominal sleeve diameter, and the second fluid pressure greater than the first fluid pressure.

3. The system of claim 1:
further comprising an intermediate tube interposed between the inner tube and the outer sleeve, the intermediate tube offset from the proximal tube section of the inner tube; and
wherein the first ferrule comprises a crimped ferrule comprising:
an uncrimped section enclosing the intermediate tube and the inner tube;
a crimped section compressing the proximal tube section against an outer surface of the first needle to:
form a seal configured to prevent flow of the fluid through an interstice between the outer surface of the first needle and the proximal tube section; and
form a ramp of the proximal tube section over a proximal end of the crimped ferrule, the ramp configured to prevent flow of the fluid through the interstice.

4. The system of claim 1, wherein the first fluid distribution block is configured to transfer the fluid through the first needle into the inner tube, the fluid:
flowing through a first interstice between the inner tube and an outer surface of the first needle;
flowing through a second interstice between a first section of potting material, within the first inner annular void, and the proximal tube section, the proximal tube section:
forming a ramp over a proximal end of the first ferrule from compression of the first ferrule, the first section of potting material, and the fluid against the proximal tube section; and
configured to prevent flow of the fluid between the inner tube and the first ferrule; and
flowing through a third interstice between the inner wall of the first cavity and a second section of potting material within the first outer annular void, the first set of retention features arranged about the inner wall and configured to prevent flow of the fluid to a distal end of the first fitting.

5. The system of claim 1, wherein the volume of potting material is formed by:
injecting the potting material into the outer annular void, the potting material flowing through the outer annular void into the inner annular void; and
curing the potting material.

6. The system of claim 1:
wherein the set of retention features extends from a distal end of the first fitting to a first section of the cavity, offset from the proximal end of the first fitting, each retention feature, in the first set of retention features:
comprising an undercut formed inset from the inner wall of the first cavity; and
defining a triangular geometry; and wherein the first volume of potting material is configured to:
occupy each undercut, of each retention feature, in the set of retention features; and
prevent flow of the fluid through an interstice between a first section of potting material, within the first outer annular void, and the inner wall of the first cavity.

7. The system of claim 1, wherein the first fitting further comprises:
an inlet port arranged at a proximal end of the first fitting, the first needle extending through the inlet port;
a groove offset from the inlet port and inset from an outer surface of the first fitting;
a gasket arranged about the groove and configured to prevent flow of the fluid from the first fluid distribution block across the outer surface of the first fitting; and
a set of threads:
arranged about an outer surface of the first fitting and offset from the groove;
configured to retain the first fitting within the first fluid distribution block; and
configured to transfer tensile forces from the inner tube and the outer sleeve to the first fluid distribution block responsive to a first fluid pressure at the inlet port increasing pressure within the inner tube.

8. The system of claim 1:
further comprising:
a mounting block; and
a second fitting:
defining a second cavity;
defining a second bore;
comprising a second set of retention features arranged within the second cavity; and
coupled to the mounting block;
wherein the inner tube defines a distal tube section arranged within the second cavity of the second fitting;
further comprising:
a stopper:
arranged within the distal tube section of the inner tube and extending through the second bore of the second fitting; and
configured to block transfer of fluid within the inner tube to the mounting block; and
a second ferrule:
arranged about the distal tube section of the inner tube within the second cavity; and
compressing the distal tube section of the inner tube, offset from a distal end of the inner tube, about the stopper;
wherein the outer sleeve further defines a distal sleeve section defining:
a second outer annular void between an inner wall of the second cavity and the outer sleeve; and
a second inner annular void between the stopper and the outer sleeve; and
further comprising a second volume of potting material arranged within the second cavity of the second fitting and configured to:
occupy the second inner annular void and the second outer annular void within the second cavity of the second fitting;
retain the distal tube section of the inner tube, the stopper, the second ferrule, and the distal sleeve section of the outer sleeve against the second fitting; and transfer tensile forces from the inner tube and the outer sleeve into the second fitting and the mounting block.

9. The system of claim 1:
further comprising:
   a second fluid distribution block; and
   a second fitting:
      defining a second cavity;
      defining a second bore;
      comprising a second set of retention features arranged within the second cavity; and
      coupled to the second fluid distribution block;
   wherein the inner tube defines a distal tube section arranged within the second cavity of the second fitting;
further comprising:
   a second needle:
      arranged within the distal tube section of the inner tube and extending through the second bore of the second fitting; and
      configured to transfer fluid from the second fluid distribution block through the inner tube to increase pressure within the inner tube;
   a second ferrule:
      arranged about the distal tube section of the inner tube within the second cavity; and
      compressing the distal tube section of the inner tube, offset from a distal end of the inner tube, about the second needle;
   wherein the outer sleeve further defines a distal sleeve section defining:
      a second outer annular void between an inner wall of the second cavity and the outer sleeve; and
      a second inner annular void between the second needle and the outer sleeve; and
further comprising a second volume of potting material arranged within the second cavity of the second fitting and configured to:
      occupy the second inner annular void and the second outer annular void within the second cavity of the second fitting;
      retain the distal tube section of the inner tube, the second needle, the second ferrule, and the distal sleeve section of the outer sleeve against the second fitting; and
      transfer tensile forces from the inner tube and the outer sleeve into the second fitting and the second fluid distribution block.

10. The system of claim 1:
wherein the inner tube defines a first durometer; and
further comprising an intermediate tube;
   interposed between the inner tube and the outer sleeve;
   defining a second durometer greater than the first durometer; and
   configured to shield the inner tube from:
      extrusion through interstices between fibers in the outer sleeve; and
      abrasion by the outer sleeve resulting from inflation and deflation of the inner tube against the outer sleeve.

11. The system of claim 1:
wherein the outer sleeve defines a first surface roughness;
further comprising an intermediate sleeve:
   interposed between the proximal sleeve section of the outer sleeve and the inner wall of the first cavity of the first fitting; and
   defining a second surface roughness greater than the first surface roughness; and
   wherein the volume of potting material is configured to:
      impregnate interstices between fibers of the intermediate sleeve;
      bond the intermediate sleeve and the outer sleeve to the potting material; and
      retain the intermediate sleeve and the outer sleeve within the first cavity of the first fitting.

12. The system of claim 1, wherein the outer sleeve comprises a set of braided strands, the set of braided strands comprising:
   a first subset of strands:
      twisted in a first direction; and
      braided in a second direction orthogonal to the first direction across the outer sleeve; and
   a second subset of strands:
      twisted in a third direction, opposite the first direction;
      braided in a fourth direction, orthogonal the third direction, across the outer sleeve; and
      cooperating with the first subset of strands to transfer tensile forces in an axial direction evenly across the outer sleeve toward the first fitting.

13. The system of claim 1, wherein the outer sleeve comprises a set of braided strands, each strand in the set of braided strands:
   formed of liquid crystal polymer fibers; and
   comprising an elastomeric coating configured to, responsive to increased pressure within the inner tube to expand the outer sleeve:
      retain the strands in a braided configuration across a length of the outer sleeve; and
      reduce friction between adjacent strands to increase flexibility of the outer sleeve.

14. The system of claim 1, wherein the first volume of potting material occupies the first outer annular void to form a radiused transition:
   extending from a distal end of first fitting to an outer surface of the outer sleeve; and
   configured to stress concentrations proximal the distal end of the first fitting during expansion of the outer sleeve.

15. The system of claim 1:
wherein the first ferrule extends from the proximal tube section and terminates proximal a distal end of the first fitting to define a nominal gap between the outer sleeve and the inner tube; and
wherein the inner tube is configured to, responsive to a first fluid pressure at the first fluid distribution block:
   expand to reduce the nominal gap between the outer sleeve and the inner tube; and
   expand the outer sleeve to an outer sleeve diameter, greater than the nominal sleeve diameter; and
   transfer tensile forces from the outer sleeve to the first fitting.

16. A system:
comprising:
   a first fitting coupled to a first fluid distribution block;
   an inner tube defining a proximal tube section arranged within the first fitting;
   a first needle:
      arranged within the proximal tube section of the inner tube and extending through the first fitting; and
      configured to transfer a fluid from the first fluid distribution block into the inner tube to increase pressure within the inner tube;
   a first ferrule compressing the proximal tube section of the inner tube, offset from a proximal end of the inner tube, about the first needle;

an outer sleeve defining a proximal sleeve section forming a void within the first fitting; and
a first volume of potting material configured to:
occupy the void within the first fitting; and
retain the proximal tube section of the inner tube, the first needle, the first ferrule, and the proximal sleeve section of the outer sleeve against the first fitting;
operable in a retracted position, the outer sleeve retracted to a nominal sleeve diameter responsive to supply of the fluid at a first fluid pressure to the inner tube by the first fluid distribution block, in the retracted position; and
operable in an expanded position, the outer sleeve expanded to a first sleeve diameter, responsive to supply of the fluid at a second fluid pressure to the inner tube by the first fluid distribution block that expands the inner tube and the outer sleeve and increases tensile forces applied by the outer sleeve onto the first fluid distribution block, in the expanded position, the first sleeve diameter greater than the nominal sleeve diameter, and the second fluid pressure greater than the first fluid pressure.

17. The system of claim 16:
further comprising an intermediate tube interposed between the inner tube and the outer sleeve, the intermediate tube offset from the proximal tube section of the inner tube; and
wherein the first ferrule comprises a crimped ferrule comprising:
an uncrimped section enclosing the intermediate tube and the inner tube; and
a crimped section compressing the proximal tube section against an outer surface of the first needle to:
form a seal configured to prevent flow of the fluid through an interstice between the outer surface of the first needle and the proximal tube section; and
form a ramp of the proximal tube section over a proximal end of the crimped ferrule, the ramp configured to prevent flow of the fluid through the interstice.

18. The system of claim 16, further comprising the first fluid distribution block, the first fluid distribution block configured to transfer the fluid through the first needle into the inner tube, the fluid:
flowing through a first interstice between the inner tube and an outer surface of the first needle;
flowing through a second interstice between a first section of potting material, within the void, and the proximal tube section, the proximal tube section:
forming a ramp over a proximal end of the first ferrule from compression of the first ferrule, the first section of potting material, and the fluid against the proximal tube section; and configured to prevent flow of the fluid between the inner tube and the first ferrule; and
flowing through a third interstice between an inner wall of the first fitting and a second section of potting material within the void, the inner wall comprising a first set of retention features configured to prevent flow of the fluid to a distal end of the first fitting.

19. The system of claim 16, wherein the outer sleeve comprises a set of braided strands, the set of braided strands comprising:
a first subset of strands:
twisted in a first direction; and
braided in a second direction orthogonal to the first direction across the outer sleeve; and
a second subset of strands:
twisted in a third direction, opposite the first direction;
braided in a fourth direction, orthogonal the third direction, across the outer sleeve; and
cooperating with the first subset of strands to transfer tensile forces in an axial direction evenly across the outer sleeve toward the first fitting.

20. An apparatus comprising:
a first fitting:
an inner tube defining a proximal tube section arranged within the first fitting;
a first needle:
arranged within the proximal tube section of the inner tube and extending through the first fitting; and
configured to transfer fluid into the inner tube to increase pressure within the inner tube;
a first ferrule:
arranged about the proximal tube section of the inner tube within the first fitting; and
compressing the proximal tube section of the inner tube, offset from a proximal end of the inner tube, about the first needle;
an outer sleeve:
concentrically encompassing the inner tube;
defining a nominal sleeve diameter configured to increase responsive to increased pressure within the inner tube; and
defining a proximal sleeve section forming a void within the first fitting; and
a first volume of potting material configured to:
occupy the void within the first fitting;
retain the proximal tube section of the inner tube, the first needle, the first ferrule, and the proximal sleeve section of the outer sleeve against the first fitting; and
transfer tensile forces from the inner tube and the outer sleeve into the first fitting.

* * * * *